Dec. 14, 1937.  M. ROMANO  2,102,188
WINDSHIELD WIPER
Filed Feb. 13, 1935
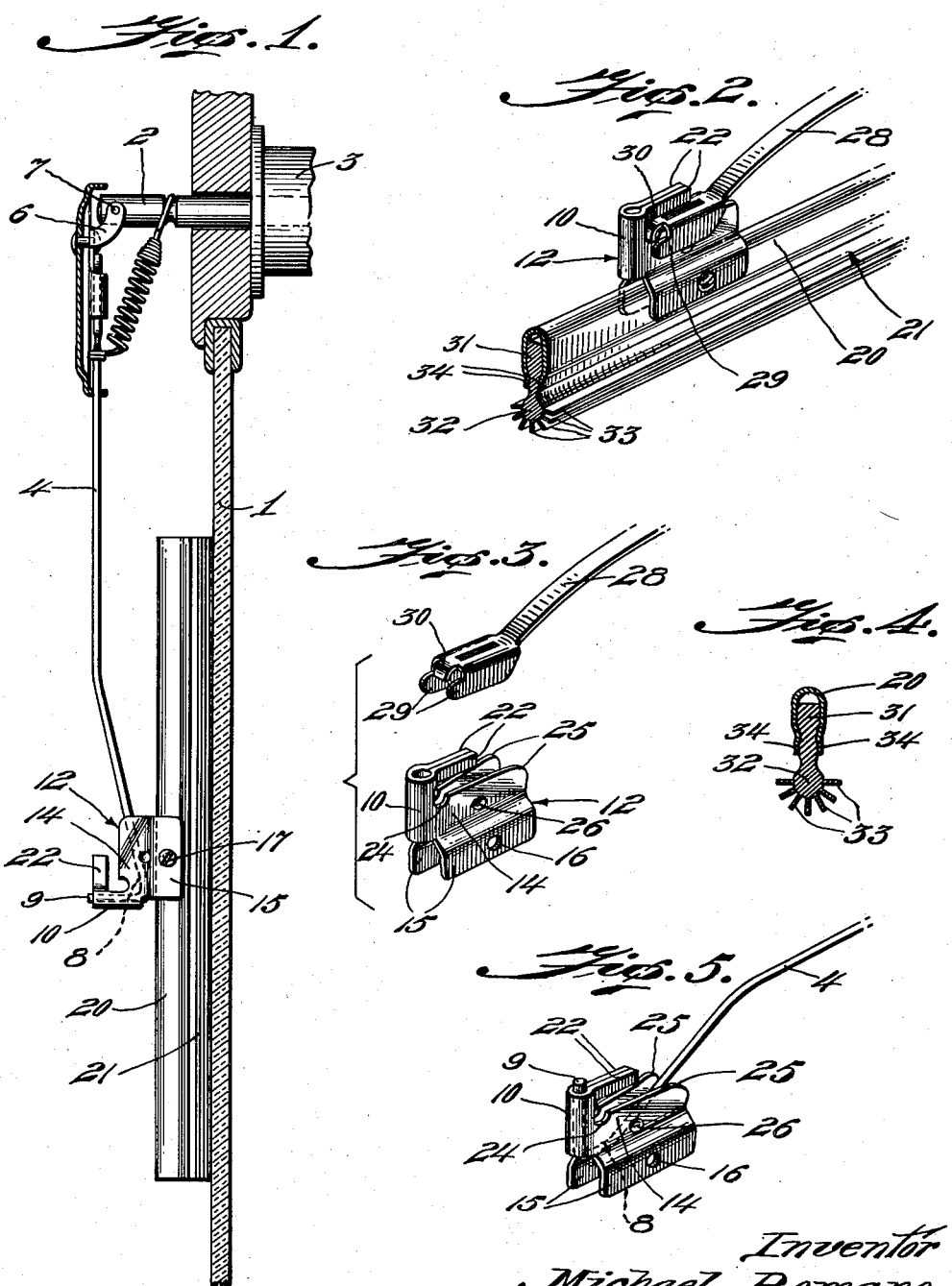
Inventor
Michael Romano,
By Perley H. Plant,
Attorney Patented Dec. 14, 1937

2,102,188

UNITED STATES PATENT OFFICE 2,102,188

WINDSHIELD WIPER

Michaèl Romano, Providence, R. I.; Adeline Romano administratrix of said Michaèl Romano, deceased Application February 13, 1935, Serial No. 6,280

2 Claims. (Cl. 15—250)

This invention relates to an improved wiper mechanism for automobile windshields.

Heretofore, windshield wiper blades have been constructed generally either from a relatively thick wiper element having a plane edge portion for contact with the glass, and at most capable of making edge contact therewith if the blade is mounted to flop; or from a plurality of relatively thin plies of rubber or other material adapted for simultaneous contact with the windshield glass as the wiper element is drawn thereacross. The latter class of wiping elements have now generally superseded the older single heavy ply wiper element. These wiper elements formed of a plurality of relatively thin plies are open to the objection, however, that after slight use the group of closely positioned thin flat plies tend to bend over as a unit in one direction or the other and become set. In this condition such wiper blades are practically useless and must be replaced by others in order to secure efficient operation. Another objection to wiping elements of this character is that they lack sufficient rigidity to remove snow or sleet with any reasonable degree of efficiency. Through the use of a wiping element of the character shown and described herein the element may possess sufficient rigidity to remove snow or sleet and at the same time the thin flexible ribs provide a plurality of separate wiping contacts with the glass, and when the wiper blade is mounted to flop, these ribs are adapted to engage the glass successively to provide constantly changing and exceedingly efficient plural contacts for wiping water from the glass, while at the same time avoiding the difficulty of having the wiping elements or plies become set.

One object of the invention is the provision of an improved wiper blade comprising a holder and a wiper element having a portion secured in the holder and a transversely curved longitudinally extended portion located outwardly of the holder and provided with a plurality of flexible ribs extending substantially radially of the curved portion and adapted for contact with the windshield glass as the wiper is moved thereacross.

Other objects and advantages of the invention relate to various improved details of construction and novel arrangements of the parts as will be more fully set forth in the detailed description to follow.

Referring to the drawing:—

Fig. 1 is a vertical sectional view taken through a portion of an automobile windshield, showing the wiper arm and wiper arm actuating shaft in side elevation, as well as the improved wiper mechanism and the manner of its attachment to the wiper arm, Fig. 2 is a perspective view of the wiper mechanism showing the position of the parts when used in connection with a wiper arm of a type different from that shown in Fig. 1 of the drawing, Fig. 3 is a perspective view of the clip member and wiper arm shown in Fig. 2 of the drawing, in separated position, illustrating the form of the clip and showing the position of the outwardly flaring lateral portions of the clip member to illustrate their manner of engagement with the depending sides of the wiper arm, Fig. 4 is a transverse sectional view taken through the holder member and wiper element, and, Fig. 5 is a perspective view of the clip member in its associated relation with the form of wiper arm shown in Fig. 1 of the drawing.

In the embodiment of the invention illustrated herewith 1 designates an automobile windshield of a conventional type, and 2 an operating shaft which may be oscillated by a suitable motor 3 or other convenient means, and which is mounted in operative relation with the windshield 1. A wiper arm 4, which in the present instance is preferably formed from round wire stock, has one end portion provided with a connecting member 6 which may be pinned or otherwise detachably secured to the shaft 2 as indicated at 7. The opposite end portion of the wiper arm 4 is provided with a curved or bent portion 8, from which extends an outwardly projecting end 9 adapted to fit closely within the circular socket 10 of the clip member 12.

The clip member 12 may consist of an integral plate member provided with opposed sides 14 and having depending therefrom offset lateral portions 15, each provided with an opening 16 for the reception of a screw or rivet 17, whereby the offset lateral portions may be suitably connected with the channel shaped holder plate 20 of a wiper element 21. The clip member 12 may also be provided with rearwardly extending arms 22 located above and in spaced relation with the opposed sides 14, and a transverse depression 24 may be formed in the opposed sides 14 at a point adjacent to the circular socket 10 of the clip member 12 for a purpose which will be more fully described hereinafter. The opposed sides 14 of the clip member 12 are preferably provided with outwardly flaring edge portions 25, and may each have a depression 26 formed therein and so positioned as to be in opposed relation with each other to provide a stop for the bent portion 8 of the wiper arm when the outwardly projecting end 9 thereof is fitted within the circular socket 10 of the clip member.

The wiper arm 28 is provided with a pair of spaced depending sides 29 and a downturned lip 30 located at the end thereof. In connecting the wiper arm 28 with the clip member 12 the depending sides 29 are forced over the outwardly flaring edge portions 25 so as to be brought into close frictional engagement therewith, and the downturned lip 30 is forced under the rearwardly extending arms 22 and into the depressions 24 formed in the opposed sides so as to interlock with the clip member 12 and form a substantially rigid connection therewith.

The channel shaped holder plate 20 is adapted to receive a flattened fin-like portion 31 of the wiper element 21, which portion is formed integral with and supports a transversely curved longitudinally extended wiper blade 32 having a plurality of ribs 33 extending outwardly substantially radially thereof throughout the length of said core. The lateral edges 34 of the holder plate 20 may be forced inwardly slightly to grip firmly the portion 31 of the wiper element, and these lateral edges 34 may be spaced somewhat from the core portion 32 in order to permit a certain degree of flexibility between the portion 31 and the core portion in the operation of the wiper mechanism.

By reason of the offsetting of the lateral portions 15 of the clip member a certain degree of tilting movement may be permitted the holder member relative to the clip 12, while both the wiper arm 4 and the wiper arm 28 are adapted to be secured substantially rigidly to the clip member so that any flopping action which may be present in the holder member and wiper element take place between the holder member and the clip 12. While it is regarded as preferable that the holder member and wiper element be permitted a limited degree of flopping movement relative to the clip 12 it will be understood that the present form of wiper element is capable of and adapted for use with a rigidly mounted holding member in which case that portion of the wiper element between the lateral edges of the holder member and the core portion may be so formed as to provide sufficient flexibility for permitting successive contact with the windshield glass of a considerable number of the flexible ribs as the wiper element is moved backwardly and forwardly across the windshield glass.

It will be noted that by providing a transversely curved longitudinally extending wiper portion having a plurality of flexible wiping ribs extending outwardly substantially radially of the curved surface of the core and spaced from each other there is provided a plurality of thin flexible wiping contacts with the glass. Through the flopping action of the wiper blade these contacts may change with each change in direction of the wiper blade. In this way each flexible wiping rib is substantially independent of the others, not only with respect to its wiping action but also as regards any tendency to become fixed or set in one position or another through continued use. The fact that one wiping rib may become set will not thereby affect the action of the adjacent ribs because of their separation from each other. When the blade is mounted to flop, the wiping ribs on one side will operate as it travels in one direction, while those on the other side will be brought into action upon movement of the blade in the opposite direction, thus effecting an alternation in their use which serves further to protect the wiping ribs from the tendency heretofore present in thin ply wipers of the character referred to above to become set after being in use a short time. This independence of movement on the part of the wiping ribs also results in a more efficient wiping action since each wiping rib acts to a certain extent independently of the others in its contact with the glass, thus providing in effect a plurality of separate wiping contacts.

The clip member may be of substantially integral construction, as shown, and is preferably formed from a single struck-out metal shape by shaping the same to give the desired form to the side portions and offset portions, and then bending the same to form the socket 10 for the reception of the end 9 of the wiper arm 4 as well as to position the arms 22 in suitably spaced relation with the upper edge portions of the sides 14. When employed with either form of wiper arm shown and described herein, the clip member is so constructed and connected with the arm as to provide a substantially rigid connection between the wiper arm and clip whereby any undesirable looseness of the parts is prevented. When necessary or desirable, the socket 10 may be so shaped as to receive in closely fitting relation the end portion of a wiper arm 4 having a rectangular or other cross-sectional shape which may be desired.

What I claim is:—

1. In a windshield wiper mechanism, a wiper blade comprising a channel shaped holder member, a solid wiper element of uniform construction throughout its extent having a transversely curved wiper portion, a flattened fin-like part carried by said holder member, and a portion of less thickness than the main body portion of said fin-like part located adjacent to said wiper portion for permitting flexing of said wiper portion relative to the main body portion of said fin-like part, and flexible ribs extending outwardly from and radially of the transversely curved portion of said wiper element and bendable into overlapping relation with each other for multiple and successive contact with the windshield as the wiper blade is pressed into contact therewith and the curved portion of the blade is displaced laterally relative to the fin-like part in its movement across the windshield.

2. An integral windshield wiper element formed of flexible material comprising a solid, transversely rounded body portion provided throughout a portion of its circumference with flexible ribs formed integral therewith and extending longitudinally thereof, said ribs extending outwardly from the rounded portion in radially spaced relation with each other a distance sufficient so that the end of each rib will overlap a portion of the rib next adjacent thereto when forced into wiping contact with and moved across the windshield, and a flattened supporting strip formed integral with said body portion and extending longitudinally thereof, said strip having a portion of reduced thickness located adjacent to the body portion to permit flexing of the body portion relative to the strip, said supporting strip projecting outwardly radially of the body portion in a direction generally opposed to that of the flexible ribs whereby said radial flexible ribs are adapted for successive plural engagement with a windshield upon movement of the body portion in flexing relation with the supporting strip.

MICHAEL ROMANO.